United States Patent [19]

Card et al.

[11] Patent Number: 4,793,887

[45] Date of Patent: * Dec. 27, 1988

[54] UNDERWATER BONDING OF SURFACE-CONFORMING MATERIAL

[75] Inventors: Steve W. Card, Minden; Joseph R. West, Bossier City, both of La.

[73] Assignee: Morton Thiokol, Inc., Chicago, Ill.

[ * ] Notice: The portion of the term of this patent subsequent to Dec. 27, 2005 has been disclaimed.

[21] Appl. No.: 57,567

[22] Filed: Jun. 1, 1987

Related U.S. Application Data

[63] Continuation-in-part of Ser. No. 884,443, Jul. 11, 1986.

[51] Int. Cl.$^4$ .............................. C09J 3/14; C09J 5/02
[52] U.S. Cl. ................................ 156/307.3; 102/321; 156/331.2; 248/205.3; 523/177
[58] Field of Search ......................... 156/331.2, 307.3; 523/177; 248/205.3; 102/321

[56] References Cited

U.S. PATENT DOCUMENTS 3,896,077  7/1975  Leonard et al. ................. 156/331.2

FOREIGN PATENT DOCUMENTS 2078763  1/1982  United Kingdom ............. 156/331.2

*Primary Examiner*—John J. Gallagher
*Attorney, Agent, or Firm*—Wayne E. Nacker; Gerald K. White

[57] ABSTRACT

Surface-conforming materials, such as sheets, ribbons, tapes or moldable material may be adhered to a wide variety of underwater target surfaces with a cyanoacrylate adhesive. The cyanoacrylate adhesive is evacuated from its container under water, applied to a surface of the surface-conforming material, and then the surface-conforming material is pressed against the target surface for a relatively short period of time. The method provides a method, for example, of attaching a plastic explosive to the hull of a ship entirely under water.

9 Claims, No Drawings

UNDERWATER BONDING OF SURFACE-CONFORMING MATERIAL

This application is a continuation-in-part of U.S. patent application Ser. No. 884,443, filed July 11, 1986. The teachings of said parent application are incorporated herein by reference.

The present invention is directed to underwater bonding of surface-conforming materials to target surfaces.

BACKGROUND OF THE INVENTION

There exists a need for a system of adhering surface-conforming material of some significant weight to an underwater target. In particular, military applications require a non-invasive means of attaching a plastic explosive to an underwater target surface, such as a submerged surface of a hostile ship. The target surface may be made of a variety of substances and may be rough or uneven. It is necessary that the plastic explosive remain adhered for a sufficient period of time for personnel to remove themselves from the site, and in many cases, it may be desirable that the device remain adhered to the site for a period of several days.

For some time now the U.S. Army has been using a two-sided tape to bond plastic explosives to target surfaces. If the target surface is very cold or is under water, an adhesive (unlike those used in accordance with the present invention) is applied to the surfaces of the tape prior to bonding. This bonding system has proven to be particularly unsatisfactory for underwater bonding, and for some time the Army has waived its target specifications for lack of a bonding system which meets its requirements. It is therefore a general object of the present invention to provide a system for bonding surface-conforming materials, such as plastic explosives, to underwater target surfaces.

Although the present invention was developed in response to a military requirement, the invention is applicable to civilian applications where bonding of a surface-conforming material to an underwater target surface is required.

SUMMARY OF THE INVENTION

In accordance with the invention, a non-invasive method of adhering a somewhat weighty, surface-conforming object to a variety of underwater target surfaces, including rough or uneven surfaces, comprises applying a cyanoacrylate adhesive or glue to a surface of the surface-conforming material, and pressing the surface-conforming material against the target surface so as to conform the material to the target surface and provide a layer of cyanoacrylate adhesive between the material and the target surface and continuing to apply pressure to the surface-conforming material for a sufficient period of time that a bond forms which is sufficient to support the weight of the surface-conforming material from the target surface. In a variation of the method, the cyanoacrylate is applied to the target surface, and the surface-conforming material is then pressed against the cyanoacrylate-covered target surface. The entire bonding procedure surprisingly may be carried out under water, including evacuating the cyanoacrylate adhesive from its container under water and applying it to the target surface.

DETAILED DESCRIPTION OF CERTAIN PREFERRED EMBODIMENTS

In accordance with the present invention, it is found that cyanoacrylate adhesives may be applied to an exposed surface of a surface-conforming material and that the cyanoacrylate-covered material may be pressed against an underwater target surface, including rough surfaces of a variety of materials, and adhesively bond the conforming material to the target surface within a very short period of time so as to support the weight of the conforming material from the target surface.

The fact that a cyanoacrylate adhesive can be used to effect a bond entirely under water which meets previously unachieved specifications is very surprising and unexpected and is contrary to what is generally accepted regarding the properties of cyanoacrylate adhesives.

A discussion of cyanoacrylate adhesives is provided in *Kirk-Othmer Encyclopedia of Chemical Technology*, H. F. Mark et. al. eds. John Wilson & Sons, New York, Vol. 1, pp 408–413. Among the teachings in this reference are that: highly exothermic polymerization which can result from the direct addition of alcohols, bases (including weak amines), water, or surface activating agents should also be avoided; that cyanoacrylate adhesives should be protected from moisture; and that moisture deteriorates cyanoacrylate polymer bonds. That underwater bonds which are unachievable using other adhesive materials can be achieved with cyanoacrylate is therefore entirely opposite to conventional understanding. Furthermore, the reference teaches that strongest bonds are obtained when the bond thickness is less than 50 microns. Bond strengths decrease and set times generally increase if the gap is greater than 50 microns thickness. Generally, cyanoacrylates are known to be most useful for forming bonds between smooth surfaces which promote formation of very thin cured adhesive layers and, thus, strong bonds. Hence, it is further surprising and unexpected that reasonably strong bonds can be formed between a surface of a surface-conforming material and rough target surfaces.

Although Applicants are not bound by any particular theory as to why bonds can be formed with cyanoacrylates under conditions which "fly in the face" of conventional understanding about the nature of cyanoacrylate adhesives, it is theorized that although moisture does effect a very rapid cure of cyanoacrylates, under rapid cure and heat-extracting conditions, cyanoacrylates are self-encapsulating. Thus, when a cyanoacrylate is expelled from its container under water, a surface cure is immediately effected, providing a thin protective casing or film around a volume of uncured cyanoacrylate. Such encapsulation may actually take the form of production of multiple microcapsules. Although water-initiated cure is known to be highly exothermic, the volume of water surrounding the cyanoacrylate represents a heat sink which is probably responsible for limiting the rate and extent of water-catalyzed cure. When the encapsulated-cyanoacrylate is pressed, e.g., through the surface-conforming material against the target surface, water is locally pushed out from along the target surface and the encapsulating film(s) is ruptured, contacting yet uncured cyanoacrylate directly with both the surface of the surface-conforming material and the target surface in the localized presence of a sufficiently low concentration of water for an effective bond to be formed.

The surface-conforming nature of the material to be attached helps to ensure that a substantial degree of close contact may be established even with a rough or uneven surface to provide a sufficiently strong bond. It is known that the most secure cyanoacrylate bonds are formed between smooth surfaces; nevertheless, effective bonds are formed in accordance with the invention between surface-conforming materials and rough and uneven target surfaces. When pressed against the surface, sufficient localized regions of the conforming material come into very close proximity to regions of the target surface, establishing localized bonding regions. It is appreciated that the invention does not generally provide bonds that anywhere near approach the holding power of cyanoacrylate bonds which normally form between smooth, dry surfaces, but that sufficient micro regions of strong bonding between the surface-conforming material and the target surface provide sufficient holding power per unit area to hold objects of at least ⅛ lb. per in$^2$ of surface area (8.8 gm per cm$^2$) from either a vertical surface or from a downward-facing horizontal (underside) target surface.

Between micro regions of effective bonding, excess cyanoacrylate may not form strong bonds but may nevertheless cure to form polymeric mass which surrounds the micro regions of effective bonding. The bonds in the presence of water are not permanent, and it is believed that water eventually degrades the cyanoacrylate polymer; however, the bonding regions may be protected from water attack for a period of time until the surrounding polymeric mass is sufficiently degraded by water attack. Bonds formed in accordance with this invention are nevertheless demonstrated to have a sufficient life-expectancy appropriate for certain military applications and certain other applications, such as short-term emergency repairs.

Surface-conforming material may include flexible material with a well-defined configuration, such as a strip or a tape. Some plastic explosive material, for example, may take the form of an elastomer and may be applied to a target surface as strips or the like. The surface-conforming material may have some resiliency or tendency to assume a particular configuration; however, any such resiliency has a tendency to act against bond formation. Of course, the extent that resiliency tends to act against bond formation depends upon the degree of distortion required to conform the material to the target surface. In attaching a strip of plastic explosives to a target surface, resiliency is generally not of great concern because small amounts of plastic explosive surface bonding may be required and relatively regular regions of the target surface may be available for attachment of the plastic explosive. Surface-conforming material, including some plastic explosives, may be putty-like and moldable to assume the configuration of the target surface without tendency to reassume an original configuration. Such materials are typically flattened to provide a generally broad surface to which the cyanoacrylate adhesive is applied.

The cyanoacrylate adhesive may be evacuated from its container, e.g., by squeezing a tube, while under water and applied to a submerged surface of the surface-conforming material. In such case, the encapsulation as described above occurs immediately. Within a relatively short period of time, the surface-conforming material is then pressed against the target object. Generally, after application of the cyanoacrylate to the surface-conforming material, not more than about 15 minutes should elapse until application of the conforming material to the target surface. Typically, the time between cyanoacrylate application to the conforming material and application of the conforming material to the target surface will be much less, e.g., less than a minute. It is necessary to press the conforming material against the target surface for a time sufficient to effect at least a partial cure in the micro bonding regions; however, this is generally about 30 seconds or less, a convenient amount of time for the material to be hand-held.

It is also within the scope of the present invention to initially apply the cyanoacrylate directly to an underwater target surface and then press the surface-conforming material against the target surface and hold the material against the target surface until the bond forms. In most cases, however, it is easier to apply the adhesive to the surface-conforming material, particularly if the surface-conforming material is easily handled and/or if the target surface is rough or uneven.

It is a convenience, rather than a requirement, that the cyanoacrylate be evacuated from its container underwater, and the cyanoacrylate may be applied in air to the surface-conforming material and then submerged for attachment to the underwater target surface. If a plastic explosive is to be attached surreptitiously to a target surface, it is desirable to perform the whole process underwater. On the other hand, for emergency underwater repairs, particularly when the repairer does not have underwater breathing equipment, it may be preferred to apply the cyanoacrylate to a surface of the conforming material above the surface and then apply the material to the target surface under water.

An apparent advantage to evacuating the cyanoacrylate from its container under water is that the viscosity of the cyanoacrylate formulation is considered less important if evacuated from the container under water. Cyanoacrylate formulations having viscosities ranging from 75–10,000 cps (preferably 75 to 5000 cps and most preferably between about 2000 and about 2500 cps) are used to provide successful bonds under water. As noted above, cure to form an encapsulating film appears to be extremely rapid when applied under water, and it is likely that even the most fluid cyanoacrylates will self-encapsulate to a significant extent under water. On the other hand, if the cyanoacrylate is to be applied to the surface-conforming material in air, a more viscous cyanoacrylate formulation is preferred, i.e., in the range of from about 1000 to 10,000 cps. Curing is more uniform in air than in water, and although a protective film will form on globules of thickened cyanoacrylate adhesive formulations, highly fluid cyanoacrylate adhesive formulations may cure completely on the surface-conforming material before the surface-conforming material can be applied to an underwater target surface. Even for underwater application, thickened cyanoacrylate formulations are preferred for ease of workability and to ensure encapsulation of sufficient quantities of uncured cyanoacrylates. That is, it is generally preferred to use cyanoacrylate compositions having viscosities above about 1000 cps.

The higher viscosity cyanoacrylate formulations comprise, in addition to cyanoacrylate monomers, viscosity regulators or thickeners, which are soluble in the cyanoacrylate monomer such as polymethacrylates, cellulose esters and prepolymerized cyanoacrylic esters, as is known in the art, and these thickened cyanoacrylate formulations are considered within the scope of the invention, and in fact, represent preferred aspects of the invention.

The cyanoacrylate monomers are selected from among those known in the art, particularly alkyl 2-cyanoacrylates where the alkyl is a short, straight or branched-chain alkyl group having from one to five carbon atoms. The preferred cyanoacrylate monomer for purposes of this invention is ethyl 2-cyanoacrylate.

It is further preferred that the cyanoacrylate adhesive formulation include polymerization inhibitors to increase shelf-life. Preferably, a combination of an anionic and a free-radical inhibitor is used for shelf-life extension. Known anionic inhibitors include phosphorus pentoxide, phosphoric acid, nitric oxide, sulfur dioxide and propane sulfone. Known free-radical inhibitors include hydroquinone, catechol and derivatives of hydroquinone and catechol.

It is further found that shelf-life is enhanced if the cyanoacrylate formulation is packaged in metal containers, e.g., aluminum tubes. It is found that water molecules can slowly enter containers formed of polymeric material, initiating premature polymerization of the monomers.

EXAMPLE 1

Underwater tests were conducted to test bonding of ribbons of tape. The tape was weighted with ⅛ lb. per in$^2$ of surface area. Approximately 3 gm of adhesive was used for bonding each ribbon to the surface. Tests were conducted in tap water and in 4% sodium chloride solution (simulated seawater) and on vertical and horizontal (underside) surfaces. The cyanoacrylate adhesive used is sold under the trademark "Permabond 240" and is a thickened ethyl 2-cyanoacrylate with a viscosity range of 2,000–2,400 cps. The cyanoacrylate was applied to a surface of the ribbon and then either immediately or after 10 minutes (delayed), the ribbon was pressed to a submerged surface for 30 seconds.

The table below specifies the number of hours the bond adhered. An asterisk (*) shows that the bond adhered for the maximum time of 72 hours. A number shows the time of failure in hours.

| Target Surface | Unsalted Water Immediate Bonding | | Unsalted Water Delayed Bonding | |
| --- | --- | --- | --- | --- |
| New Steel Horizontal | 48 | * | * | * |
| New Steel Vertical | 24 | * | 48 | * |
| Weathered Steel Horizontal | * | * | * | * |
| Weathered Steel Vertical | * | * | * | * |
| Painted Steel Horizontal | 24 | 72 | 48 | * |
| Painted Steel Vertical | 24 | 24 | 48 | * |
| New Wood Horizontal | * | * | * | * |
| New Wood Vertical | * | * | * | * |
| Weathered Wood Horizontal | * | * | * | * |
| Weathered Wood Vertical | * | * | * | * |
| Painted Wood Horizontal | * | * | * | * |
| Painted Wood Vertical | * | * | * | * |
| New Concrete Horizontal | * | * | * | * |
| New Concrete Vertical | * | * | * | * |
| Weathered Concrete Horizontal | * | * | * | * |
| Weathered Concrete Vertical | * | * | * | * |
| Painted Concrete Horizontal | * | * | * | * |
| Painted Concrete Vertical | * | * | * | * |

| Target Surface | Salted Water Immediate Bonding | | Salted Water Delayed Bonding | |
| --- | --- | --- | --- | --- |
| New Steel Horizontal | 24 | 24 | 72 | 72 |
| New Steel Vertical | 24 | 24 | 72 | * |
| Weathered Steel Horizontal | * | * | * | * |
| Weathered Steel Vertical | * | * | 72 | * |
| Painted Steel Horizontal | 24 | * | 72 | 72 |
| Painted Steel Vertical | 24 | * | 72 | 72 |
| New Wood Horizontal | * | * | * | * |
| New Wood Vertical | * | * | * | * |
| Weathered Wood Horizontal | * | * | * | * |
| Weathered Wood Vertical | 24 | * | * | * |
| Painted Wood Horizontal | * | * | * | * |
| Painted Wood Vertical | * | * | * | * |
| New Concrete Horizontal | * | * | * | * |
| New Concrete Vertical | * | * | * | * |
| Weathered Concrete Horizontal | * | * | * | * |
| Weathered Concrete Vertical | * | * | * | * |
| Painted Concrete Horizontal | * | * | * | * |
| Painted Concrete Vertical | * | * | * | * |

EXAMPLE 2

A further test was performed under water as per Example 1 with painted steel substrates only. The steel surfaces were first stripped of all old paint and treated with a zinc phosphate solution, primed and painted. The paint was then baked on the surface. This further test was performed due to a large number of underwater strength test failures on painted steel target surface in Example 1. These failures were due to the paint stripping from the steel (a bad paint application). Weighted ribbons were applied to 6 vertical surfaces and 6 horizontal underside surfaces. In each case, the bonds remained for 120 hours. This test shows that the adhesive will adhere a surface-conforming material to a painted steel surface.

EXAMPLE 3

Putty-like patches of C-4 explosive (1.17 lbs. each, about 25 square inch surface area) were bonded with permabond 240 to underwater steel, rusted steel, cement and wood surfaces. In each case, the bonded explosive was transported from the place of bonding to a bunker and detonated.

Of course, in adhering a material to a surface, it is not always possible to select the surface; however, this test shows that early failures on painted steel surfaces were not the result of poor bonding of the surface-conforming material to the target surface, but rather a failure of the paint to steel.

Advantages of the invention may now be more fully appreciated. The invention provides for attachment of surface-conforming materials, such as a plastic explosive, to a variety of underwater target surfaces, including concrete, metallic and wooden materials which may be weathered or new, painted or unpainted, smooth or rough or wet or dry. Underwater adhesion, either in salt water or in fresh water, for at least 3 days is often achieved. Attachment may be to any portion of a target surface, including vertical and underside surfaces. The bond can withstand motion or vibration. Attachment is often accomplished within 30 seconds. At least 8.8 gm of material is attachable per $cm^2$ of surface area. The material can be quickly, easily, quietly and safely applied, even by an unskilled person. Less than ½ pound of adhesive is required for application of 20 pounds of object.

While the invention has been described in terms of certain preferred embodiments, modifications obvious to one with ordinary skill in the art may be made without departing from the scope of the present invention. Various features are set forth in the following claims.

What is claimed is:

1. A method of adhering a surface-conforming material to a target surface which is submerged underwater, the method comprising
    applying to a surface of said conforming material or to said target surface a cyanoacrylate formulation consisting essentially of cyanoacrylate monomers with or without dissolved thickening agents, said cyanoacrylate formulation having a viscosity between about 75 cps and about 10,000 cps, and
    pressing said conforming material against said target surface to establish contact of said conforming material surface with said target surface and for a period of time sufficient to effect a cure of said cyanoacrylate adhesive formulation to form a bond adequate to support said conforming material from said target surface.

2. A method according to claim 1 wherein said cyanoacrylate adhesive formulation is evacuated from a container and applied to a surface while submerged under water.

3. A method according to claim 1 wherein said cyanoacrylate adhesive formulation has a viscosity of between about 1000 cps and about 10,000 cps.

4. A method according to claim 1 wherein said cyanoacrylate adhesive formulation has a viscosity of between about 2000 cps and about 2500 cps.

5. A method according to claim 1 wherein said surface-conforming material is a sheet, tape or ribbon.

6. A method according to claim 1 wherein said surface-conforming material is a moldable material.

7. A method according to claim 1 wherein said surface-conforming material is a plastic explosive.

8. A method according to claim 1 wherein said surface-conforming material weighs at least about 8.8 gm per $cm^2$ of bonding surface area.

9. A method according to claim 1 wherein said surface-conforming material is pressed against said target surface for about 30 seconds or more.

* * * * *